United States Patent Office 3,634,273
Patented Jan. 11, 1972

3,634,273
THICKENED CHLORINATED SOLVENT
COMPOSITIONS AND METHOD
Byron E. Marsh, Western Springs, Layton E. Kinney, Villa Park, and Roy J. Betty, Jr., Chicago, Ill., assignors to Armour Industrial Chemical Company
No Drawing. Filed Jan. 10, 1968, Ser. No. 696,714
Int. Cl. C09d 9/00; C11d 7/50
U.S. Cl. 252—170
10 Claims

ABSTRACT OF THE DISCLOSURE

Thickened solvent compositions comprising a chlorinated solvent and urea produced by the in situ reaction of an aliphatic amine and an isocyanate, and method of forming such compositions. The compositions of this invention provide thixotropic stripping and cleaning compositions for uses such as degreasing and paint removing. Thickened fire extinguisher fluids may be formed according to this invention. Chlorinated solvents may be thickened to form solid compositions useful as cleaning sticks.

BACKGROUND OF THE INVENTION

The desirability of thickened chlorinated solvent compositions has long been recognized. Particularly desirable are highly thixotropic chlorinated solvent compositions. Thixotropy is a phenomenon for which the exact mechanism of functioning has not been satisfactorily explained, resulting in compositions becoming less viscous when subjected to high shear forces and then returning to their normal condition when they are allowed to stand. Such properties are extremely desirable in many use applications involving chlorinated aliphatic compounds, so that they will tend to flow out evenly when brushed or sprayed, but will return quickly to their higher viscosities. These desired characteristics result in ease of brushing, lack of sagging or run off, spill resistance of the composition and low penetration into porous materials to which the compositions may be applied. For example, it is readily apparent that such compositions would be especially suited for use as paint or varnish removers which may be either applied by spray or brush, and exhibit minimal or no sag when applied to vertical surfaces. Such desired characteristics are also obvious in reference to degreasing or other stripping or cleaning operations.

The use of chlorinated compounds such as carbon tetrachloride as a fire extinguisher fluid has also been somewhat limited due to the low viscosity of the liquid. Thickened carbon tetrachloride compositions, such as gels, are extremely desirable for use in fire fighting.

Previous methods of obtaining bodying or thickening of solvents have been the use of waxes as in paint removers, fatty acid soaps, bentonite clays, bentonite clays treated with quaternary ammonium compounds, and obtaining gelling by saponification by saponifiable groups of polymeric organic compounds. However, the prior methods generally do not provide the degree of thixotropy desired and many of the methods further have the disadvantage of containing a large amount of thickening agent which remains on the surface as undesirable residue.

DESCRIPTION OF THE INVENTION

This invention is directed toward thickened chlorinated solvent compositions and methods for their preparation which obviate many of the disadvantages of the prior art materials and methods. This invention provides thixotropic paint removers, degreasing compositions, and stripping and cleaning compositions which may be sprayed with pneumatic equipment and exhibit minimal or no sag when applied to vertical surfaces. The thixotropic compositions are also especially satisfactory when applied by brush, exhibiting excellent brushing properties. The invention also provides fire extinguishing compositions which may be applied with little or no run off. Further, chlorinated solvents may be thickened according to this invention to solid or rigid configurations providing compositions useful as dry cleaning sticks.

The thickened compositions of our invention comprise a major proportion of a chlorinated solvent and a minor proportion of urea produced by the in situ reaction of an aliphatic amine and an isocyanate. The amine terminated structure is preferred.

Chlorinated aliphatic compounds which have found wide use as commercial and industrial solvents and have become known to the art as chlorinated solvents are suitable for use in compositions of this invention. This group of chemicals includes allyl chloride, carbon tetrachloride, chloroform, 1,1-dichloroethane, dichloroethylether, 1,2-dichloroethylene, dichloroisopropyl ether, ethyl chloride, ethylene dichloride, isopropyl chloride, methyl chloride, methylene chloride, perchloroethylene, propylene dichloride, 1,1,2-trichloroethane, trichloroethylene and 1,2,3-trichloropropene. Mixtures of chlorinated aliphatic compounds may be utilized in our invention.

Preferred solvents for many compositions of our invention utilize chlorinated solvents selected from the group consisting of carbon tetrachloride, ethylene dichloride, perchloroethylene, trichloroethylene, and methylene dichloride.

Aliphatic mono-amines are preferred amine reactants, particularly amines containing an aliphatic group of from about 6 to 22 carbon atoms attached to an amino nitrogen. Such aliphatic groups may be a branched or straight hydrocarbon chain and saturated or unsaturated. Primary monoamines selected from the group consisting of N-normal-alkyl, N-normal-alkenyl and N-secondary-alkyl amines having from 6 to 22 carbon atoms are preferred. Mixtures of amines can be used.

N-normal-alkyl amines suitable include hexyl, heptyl, octyl, nonyl, decyl, undecyl, dodecyl, tridecyl, tetradecyl, pentadecyl, hexadecyl, heptadecyl, octadecyl, nondecyl, eicosyl, heneicosyl, and docosyl. N-normal-alkenyl amines useful include those derived from natural sources such as soya and coco including oleyl and linoleyl amines. Usually the amines derived from natural sources are mixtures of saturated and unsaturated hydrocarbon groups of from about 8 to 18 carbon atoms. The aliphatic group may be an arylalkyl group such as 9(10)-phenyl-stearylamine as derived from oleic acid.

N-secondary-alkyl amines are especially useful due to their low melting points, resulting in long chain primary amines having fluid properties at room temperatures and under field conditions. Such amines may be produced from olefins by the method described in U.S. Pat. 3,338,-967, Aug. 29, 1967. One preferred sub-class is N-secondary-alkyl amines having from about 7 to 20 carbon atoms. These amines are usually mixtures of hydrocarbon chain length depending upon the particular olefin cut utilized. Amines of chain lengths $C_{7-9}$, $C_{9-11}$, $C_{11-14}$, and $C_{15-20}$ are commercially available and especially useful in our invention.

Isocyanates suitable for use in this invention include those isocyanates which react with an amine to form a urea. Suitable isocyanates are selected from the group consisting of aromatic and aliphatic mono- and polyisocyanates. Long chain aliphatic polyisocyanates are suitable wherein the aliphatic group contains from about 6 to 22 carbon atoms. It is preferred to use di-functional isocyanates, or prepolymers thereof, including diisocyanate selected from the group of aromatic diisocyanates, such as toluene diisocyanate, and aliphatic diisocyanates such as hexamethylene diisocyanate and the long chain aliphatic diisocyanate such as derived from 9(10)-aminostearylmine and 9(10)-aminomethylstearylamine. Toluene diisocyanate is especially preferred in formulating the compositions of this invention. Commercially available toluene diisocyanates which are mixtures of tolyl 2,4-diisocyanate and tolyl 2,6-diisocyanate are satisfactory. Generally, the tolyl 2,4 isomer is present in greatest abundance.

Suitable compositions according to our invention may be formulated by forming in situ from about 0.05 to 10 weight percent urea based upon the total composition. Preferred gel compositions contain from about 0.1 to 5 weight percent urea. The optimum concentration of urea will vary depending upon the type of solvent utilized and the particular thickening properties desired. For example, from about 1 to 10 weight percent urea is preferred to form a solid composition.

The compositions of our invention can be readily produced by adding an aliphatic amine and an isocyanate to a chlorinated aliphatic solvent to form from 0.05 to 10 weight percent, based upon the total composition, urea in situ, and maxing for a time sufficient to cause the in situ formation of urea. A preferred process is the formation of from 0.1 to 5 weight percent urea in situ. To form the ureas, it is suitable to use from less than the stoichiometric requirement of amine to isocyanate to about 40 percent excess of amine. It is especially satisfactory to use the mole ratio of amine to isocyanate of from 1:1 to 2.8 to 1. Mole ratios of from about 2:1 to 2.8:1 have been found especially suitable. It is also preferred to add the amine to the solvent first and then add the isocyanate with stirring.

The urea may be formed in situ in the total chlorinated solvent composition, or may be formed in a component of the chlorinated solvent during the formulation of the chlorinated solvent composition.

The compositions of this invention may be formulated in batches by simple mixing in tanks, and stored for use as desired. Such compositions are stable over wide temperature ranges and over long periods of time.

The following examples are presented to illustrate the present invention.

EXAMPLE I

Perchloroethylene was thickened by the in situ reaction of various N-sec-alkyl primary amines and toluene diisocyanate. The perchloroethylene was added to a beaker and an amine as noted in Table I was added directly to the perchloroethylene with stirring in an amount to produce the total additive concentration noted in Table I. Toluene diisocyanate was then added to produce the additive concentration noted in Table I and the mole ratio of 2.4 moles of amine to 1 mole of toluene diisocyanate. Stirring was continued until maximum thickening was obtained, usually a matter of seconds, but in no case longer than 5 minutes. The initial appearance of the product is noted in Table I. The appearance of the products were the same after standing for a period of 1 month in a static condition. It is seen that the range of thickness obtained is suitable for products from slightly viscous fluids to hard firm gels. Thus, highly satisfactory sprayable paint, stripping and cleaning compositions may be obtained, for example, with use of from about 2 to 4 percent N-sec-alkyl($C_{11}$–$C_{14}$) primary amine, while hard compositions suitable as dry cleaning sticks may be obtained, for example, with 4 percent N-sec-alkyl($C_7$–$C_9$) primary amine.

TABLE I

| Additive,[1] amino | Conc., percent | Time to gel | Initial appearance |
|---|---|---|---|
| N-sec-alkyl ($C_7$–$_9$) primary amine | .5 | | Slightly viscous fluid. |
| | 2.0 | 5 minutes | Hard firm gel. |
| | 4.0 | do | Do. |
| | 7.0 | do | Do. |
| | 10.0 | do | Do. |
| N-sec-alkyl ($C_9$–$_{10}$) primary amine | .5 | | Fluid. |
| | 2.0 | 5 minutes | Soft firm gel. |
| | 4.0 | do | Do. |
| | 7.0 | do | Do. |
| | 10.0 | do | Firm gel. |
| N-sec-alkyl ($C_{11}$–$_{14}$) primary amine | .5 | | Fluid. |
| | 2.0 | 5 seconds | Slight viscous gel. |
| | 4.0 | do | Viscous thick gel. |
| | 7.0 | 5 minutes | Do. |
| | 10.0 | do | Firm soft gel. |
| N-sec-alkyl ($C_{15}$–$_{20}$) primary amine | .5 | | Fluid. |
| | 2.0 | 5 seconds | Viscous gel. |
| | 4.0 | do | Soft gel. |
| | 7.0 | do | Do. |
| | 10.0 | do | Do. |

[1] Amine plus toluene diisocyanate.

EXAMPLE II

The procedure of Example I was followed using methylene chloride and mole ratios of 2.4:1 of various N-sec-alkyl primary amines as noted in Table II, to toluene diisocyanate. The initial appearance of the products is noted in Table II and the appearance of the products was the same after standing for a period of 1 month in a static condition. The viscosity was obtained by measurement with a Brookfield viscometer and the results are shown in Table II at 75° F. and revolutions per minute as noted. The thixotropic property of the gels is readily apparent from the decrease in viscosity with higher revolutions per minute as shown in Table II.

TABLE II

| Additive,[1] amine | Conc., percent | Time to gel | Initial appearance | Brookfield viscosity in centipoises at— | | | |
|---|---|---|---|---|---|---|---|
| | | | | 2 r.p.m. | 4 r.p.m. | 10 r.p.m. | 20 r.p.m. |
| N-sec-alkyl ($C_7$–$_9$) primary amine | .5 | 5 seconds | Soft gel | 900 | 820 | 900 | 480 |
| | 2.0 | do | do | 3,100 | 1,450 | 1,250 | 1,140 |
| | 4.0 | 5 minutes | Slightly firm soft gel | | | | |
| | 7.0 | do | Soft gel | | | | |
| | 10.0 | do | Firm hard gel | | | | |
| N-sec-alkyl ($C_9$–$_{10}$) primary amine | .5 | 5 minutes | Soft semi gel | 300 | 250 | 150 | 90 |
| | 2.0 | do | do | 1,400 | 1,050 | 1,000 | 480 |
| | 4.0 | do | Soft gel | | | | |
| | 7.0 | do | Soft firm gel | | | | |
| | 10.0 | do | Hard firm gel | | | | |
| N-sec-alkyl ($C_{11}$–$_{14}$) primary amine | .5 | | Fluid | 600 | 380 | 150 | 90 |
| | 2.0 | 5 seconds | Slight gel | 600 | 300 | 150 | 80 |
| | 4.0 | do | Firm gel | | | | |
| | 7.0 | do | do | | | | |
| | 10.0 | do | Hard gel | | | | |
| N-sec-alkyl ($C_{15}$–$_{20}$) primary amine | .5 | 5 seconds | Slightly viscous gel | 2,200 | 1,200 | 550 | 340 |
| | 2.0 | 5 minutes | Viscous slight gel | 1,300 | 1,050 | 550 | 280 |
| | 4.0 | do | Soft firm gel | 3,600 | 2,550 | 1,700 | 1,120 |
| | 7.0 | do | do | | | | |
| | 10.0 | do | do | | | | |

[1] Amine plus toluene diisocynate.

EXAMPLE III

In similar manner, methylene dichloride was thickened by the in situ reaction of N-coco primary amine and toluene diisocyanate in the ratio of 2:1. Coco amine is derived from coconut oil acids containing saturated and unsaturated hydrocarbon groups having from 6 to 18 carbon atoms, predominately dodecyl. The appearance of the thickened compositions as observed shortly after formation is shown in Table III.

TABLE III

| Additive concentration in percent: | Initial appearance |
|---|---|
| 2 | Thick viscous gel. |
| 4 | Soft firm gel. |
| 7 | Soft firm gel. |
| 10 | Soft firm gel. |

EXAMPLE IV

Thickened perchloroethylene compositions were obtained using the same thickening additive and procedure as Example III. The initial appearance of the gels at the stated concentration of additive is shown in Table IV.

TABLE IV

| Additive concentration in percent: | Initial appearance |
|---|---|
| 0.5 | Slightly viscous fluid. |
| 2 | Thick viscous gel. |
| 4 | Soft firm gel. |
| 7 | Soft firm gel. |
| 10 | Soft firm gel. |

EXAMPLE V

In similar manner, methylene dichloride was thickened by the in situ reaction of N-oleyl primary amine and toluene diisocyanate in the ratio of 2:1. Oleyl amine is derived from oleic acid and contains a mixture of hydrocarbon chains from $C_{12}-C_{18}$, predominately $C_{18}$ mono-unsaturated. The appearance of the thickened compositions as observed shortly after formation is shown in Table V.

TABLE V

| Additive concentration in percent: | Initial appearance |
|---|---|
| 0.5 | Thick viscous gel. |
| 2 | Soft firm gel. |
| 4 | Soft firm gel. |
| 7 | Soft firm gel. |
| 10 | Soft firm gel. |

EXAMPLE VI

Thickened perchloroethylene compositions were obtained using the same thickening additive and procedure as Example V. The initial appearance of the gels at the stated concentration of additive and viscosities at 25° C. are shown in Table VI. The thixotropy is clearly evident from the viscosity measurements.

TABLE VI

| Additive conc. in percent | Initial appearance | Brookfield viscosity in centipoises at— | | | |
|---|---|---|---|---|---|
| | | 2 r.p.m. | 4 r.p.m. | 10 r.p.m. | 20 r.p.m. |
| 0.5 | Slightly viscous liquid | | | | |
| 2 | Slightly viscous gel | 3,660 | 2,060 | 948 | 414 |
| 4 | do | | | | |
| 7 | do | | | | |
| 10 | do | | | | |

EXAMPLE VII

In a similar manner, perchloroethylene was thickened by the in situ reaction of phenylstearyl primary amine and toluene diisocyanate in a ratio of 2:1. Phenylstearyl amine is formed by the arylation of oleyl amine and is predominately 9(10)-phenylstearyl amine. A viscous liquid was formed with 2 percent urea formation and exhibited the following viscosities at 25° C.

| R.p.m.'s: | Brookfield viscosity in centipoises |
|---|---|
| 2 | 2,540 |
| 4 | 1,400 |
| 10 | 608 |
| 20 | 314 |

EXAMPLE VIII

Carbon tetrachloride was thickened by the in situ reaction of N-sec-alkyl($C_{11}-C_{14}$)primary amine and toluene diisocyanate in the ratio of 2:1. The initial appearance of the compositions at the stated amounts of additives is shown below.

| Additive concentration in percent | Initial appearance |
|---|---|
| 1 | Slightly viscous liquid. |
| 2 | Thick viscous gel. |

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considered without departing from the basic principles of the invention.

We claim:

1. A thickened solvent composition consisting essentially of a major proportion of chlorinated solvent selected from the group consisting of allyl chloride, carbon tetrachloride, chloroform, 1,1-dichloroethane, dichloroethyl ether, 1,2-dichloroethylene, dichloroisopropyl ether, ethyl chloride, ethylene dichloride, isopropyl chloride, methyl chloride, methylene chloride, perchloroethylene, propylene dichloride, 1,1,2-trichloroethane, trichloroethylene, 1,2,3-trichloropropene and mixtures thereof and about 0.05 to 10 weight percent, based upon the total composition, of di-substituted urea produced by the in situ reaction of toluene diisocyanate and primary monoamine having attached to the amino nitrogen a radical having 6 to 22 carbon atoms selected from the group consisting of normal alkyl, sec-alkyl, arylalkyl and normal alkenyl, said amine and isocyanate being in the mole ratio of amine to isocyanate of 2:1 to 2.8:1 and mixed for a time sufficient to form said urea.

2. The composition of claim 1 wherein said chlorinated solvent is carbon tetrachloride.

3. The composition of claim 1 wherein said amine is selected from N-sec-alkyl amines having from about 7 to 20 carbon atoms.

4. The composition of claim 1 wherein said composition contains from about 1 to 10 weight percent urea, based upon the total composition, forming a composition which is a solid.

5. The composition of claim 1 wherein said chlorinated solvent is selected from the group consisting of carbon tetrachloride, ethylene dichloride, perchloroethylene, trichloroethylene and methylene dichloride.

6. The composition of claim 1 having thixotropic properties.

7. The composition of claim 1 wherein said di-substituted urea is present in an amount of about 0.1 to 5 weight percent.

8. The process of forming a thickened chlorinated solvent composition by adding toluene diisocyanate and a primary monoamine having attached to the amino nitrogen a radical having 6 to 22 carbon atoms selected from the group consisting of normal alkyl, sec-alkyl, arylalkyl and normal alkenyl, to a chlorinated solvent and mixing for a time sufficient to form about 0.05 to 10 weight percent, based upon said composition, di-substituted urea in situ, said amine being added in the mole ratio of amine to isocyanate of 2:1 to 2.8:1.

9. The process of claim 8 wherein said amine is added first, and then the isocyanate is added.

10. The process of claim 8 wherein said chlorinated solvent is selected from the group consisting of carbon tetrachloride, ethylene dichloride, perchloroethylene, trichloroethylene and methylene dichloride, said amine is a mono-amine selected from the group consisting of N-normal-alkyl, N-normal-alkenyl and N-sec-alkyl amines, and said isocyanate is toluene diisocyanate.

References Cited

UNITED STATES PATENTS

| 2,926,097 | 2/1960 | Leatherman | 252—171 |
| 2,947,792 | 8/1960 | Skeeters | 260—652.5 |
| 3,173,896 | 9/1965 | Adams et al. | 260—404.5 |
| 3,358,005 | 12/1967 | Garber et al. | 260—404.5 |

LEON D. ROSDOL, Primary Examiner

W. E. SCHULZ, Assistant Examiner

U.S. Cl. X.R.

106—311; 252—364